US012447980B2

(12) United States Patent
Bubeck

(10) Patent No.: US 12,447,980 B2
(45) Date of Patent: Oct. 21, 2025

(54) SYSTEM UNIT INCLUDING A FIRST ACTUATOR SYSTEM AND A SECOND ACTUATOR SYSTEM

(71) Applicant: Robert Bosch GmbH, Stuttgart (DE)

(72) Inventor: Samuel Bubeck, Kawasaki (JP)

(73) Assignee: ROBERT BOSCH GMBH, Stuttgart (DE)

( * ) Notice: Subject to any disclaimer, the term of this patent is extended or adjusted under 35 U.S.C. 154(b) by 143 days.

(21) Appl. No.: 17/792,216

(22) PCT Filed: Mar. 17, 2021

(86) PCT No.: PCT/EP2021/056844
§ 371 (c)(1),
(2) Date: Jul. 12, 2022

(87) PCT Pub. No.: WO2021/204506
PCT Pub. Date: Oct. 14, 2021

(65) Prior Publication Data
US 2023/0065689 A1    Mar. 2, 2023

(30) Foreign Application Priority Data

Apr. 8, 2020    (DE) ............ 10 2020 204 529.1

(51) Int. Cl.
*B60W 50/029*    (2012.01)
*B60T 17/22*    (2006.01)
*G07C 5/08*    (2006.01)

(52) U.S. Cl.
CPC ......... *B60W 50/029* (2013.01); *B60T 17/221* (2013.01); *G07C 5/0816* (2013.01); *B60W 2050/0292* (2013.01)

(58) Field of Classification Search
CPC ......... B60W 50/029; B60W 2050/0292; B60T 17/221; B60T 2270/402; B60T 2270/404; B60T 2270/413; G07C 5/0816
(Continued)

(56) References Cited

U.S. PATENT DOCUMENTS

| 11,046,330 B1 * | 6/2021 | Katzourakis | .......... B60W 10/20 |
| 2010/0198473 A1 * | 8/2010 | Strengert | .............. B60T 17/221 |
| | | | 701/70 |

(Continued)

FOREIGN PATENT DOCUMENTS

| CA | 3056877 A1 * | 4/2020 | ............ B60T 13/741 |
| CN | 102405164 A | 4/2012 | |

(Continued)

OTHER PUBLICATIONS

English translation of DE-4314118-A1 (Year: 1994).*
(Continued)

Primary Examiner — Ramya P Burgess
Assistant Examiner — Preston Jay Miller
(74) Attorney, Agent, or Firm — NORTON ROSE FULBRIGHT US LLP

(57) ABSTRACT

A system unit for an at least semi-automated mobile platform. The system unit includes at least one first actuator system and one second actuator system, which each include at least one auxiliary operating mode and one emergency operating mode. The first actuator system and the second actuator system are each configured and coupled: to switch into an inactive operating mode when a critical error is identified in the respective actuator system; and to switch into an auxiliary operating mode when one of the actuator systems switches into the inactive operating mode to additionally carry out at least portions of a functionality of the respective actuator system, which is in the inactive operating
(Continued)

mode; and to switch into an emergency operating mode when a critical error is identified in the respective actuator system in the auxiliary operating mode.

12 Claims, 2 Drawing Sheets

(58) Field of Classification Search
USPC ........................................................ 701/29.2
See application file for complete search history.

(56) References Cited

U.S. PATENT DOCUMENTS

| 2016/0114779 | A1* | 4/2016 | Binder | B60T 8/171 |
| | | | | 701/76 |
| 2021/0146903 | A1* | 5/2021 | Maier | B60T 8/17 |
| 2021/0162976 | A1* | 6/2021 | Schmidt | G05D 1/228 |
| 2021/0380078 | A1* | 12/2021 | Plow | B60T 7/085 |

FOREIGN PATENT DOCUMENTS

| CN | 106660534 | A | | 5/2017 | |
| CN | 109398341 | A | | 3/2019 | |
| CN | 110435569 | A | | 11/2019 | |
| DE | 4314118 | A1 | * | 11/1994 | .............. B60T 8/175 |
| DE | 102006053617 | A1 | | 5/2008 | |
| DE | 102017113563 | A1 | | 12/2018 | |
| EP | 3557356 | A1 | * | 10/2019 | ......... G05B 23/0291 |
| FR | 2843353 | A1 | | 2/2004 | |
| WO | 2019082647 | A1 | | 5/2019 | |

OTHER PUBLICATIONS

English translation of EP_3557356_A1 (Year: 2019).*
English translation of CA-3056877-A1 (Year: 2020).*
International Search Report for PCT/EP2021/056844 Issued Oct. 29, 2021.

* cited by examiner

SYSTEM UNIT INCLUDING A FIRST ACTUATOR SYSTEM AND A SECOND ACTUATOR SYSTEM

FIELD

The present invention relates to a system unit for an at least semi-automated mobile platform including at least one first actuator system and one second actuator system.

BACKGROUND INFORMATION

Driver assistance systems are becoming more and more widely accepted in today's motor vehicles in various forms. They intervene in a semi-automated or fully automated manner in the drive, control (e.g., steering) or signaling devices of the vehicle or, using suitable human machine interfaces, warn the driver just prior to, or assist him or her during, critical situations.

By way of example, present vehicle braking systems, in addition to stabilizing functions, e.g., in the form of the traditional ESP/ABS, include an increasingly expanded functional scope: such as support of a driver by power assistance during the actuation of a brake pedal by an electromechanical brake booster (eBKV) during a brake actuation, or assisting or partially assisting functions by a system unit for the active modulation of the hydraulic brake pressure (e.g., ESP, eBKV, boost unit, etc.), without active participation by the driver.

SUMMARY

Future control systems for highly automated and/or semi-automated driving and/or autonomous and/or semi-autonomous driving make it necessary to keep certain possibly functional redundancies available, so that in the event of an error a "fail operational" system, e.g., in the case of a brake control system, may be ensured at least in a temporally limited manner, in order to potentially at least temporarily enable absent monitoring of the traffic situation by a driver, or temporarily absent responsibility authority or complete absence of a driver.

For example, a vehicle braking system may be designed in such a way that, when a first error occurs in the system, all braking functions may be taken over by a sub-unit of the braking system. In addition, the responsibility for the vehicle guidance may be returned to a driver for conventional automated driving functions, for example in a SAE Level 3 and lower, or a trip has to be prematurely terminated since no further functional fallback level is provided, and a second error in such a braking system could result in the fact that the deceleration capability of the vehicle no longer exists.

This is, in particular, of importance when such a system is used in a driving mode in which no driver is present or a driver in such a driving mode is not able to carry out an intervention.

By way of example, a braking system may include a primary and a secondary stabilization actuator system, and the primary actuator system may provide the (main) stabilizing functions in the error-free state.

Typically, the secondary actuator system, in its error-free state, may take over certain functionalities of the primary actuator system in the process. Such a functionality of the secondary actuator system may be limited to necessary functions of a fallback level or encompass the entire functional scope of the primary stabilization actuator system.

For example, a braking system in an autonomously driving vehicle, i.e., for a use case: SAE Level 4 autonomous driving, may include a primary and a second braking unit. In the event of an error of the braking system, the primary braking unit, without a secondary braking unit, may implement the full functional scope, and the secondary braking unit may include a portion of the functional scope of the primary unit, and possibly take over this portion of the functions.

Such a functionality, provided by a primary actuator system, may, for example, encompass a wheel-specific active and passive pressure modulation, e.g., with the aid of an electronic stability program (ESP) recirculating hydraulic system, and a secondary actuator system may, for example, encompass a functionality of a single-channel active and/or passive pressure modulation which, e.g., may be implemented by a fail boost unit and/or an electromechanical brake booster.

Since it is not possible for the driver to safely take over a SAE Level 4 vehicle in the event of an error in which then only one of the two braking units is functional, such a system should be designed to be as safe as possible.

Due to the combination possibilities of corresponding errors, designing such a system for an optimal response to a further error is a very complex task which is prone to errors and, due to the very low likelihood of this situation, not economical since all active controllers of the system have to be designed for the corresponding error situation for the optimal response. This means, in particular, that it must be possible to intercept absent or erroneous signals, and all required signals of sensors and actuators must continue to be monitored for plausibility. However, since a portion of the error recognition mechanisms is no longer functional due to the previously recognized errors, this is only possible with high software development complexity, while tolerating a lower likelihood that errors will be discovered.

Corresponding to one aspect of the present invention, a system unit, a use of the system unit, a method, a device, as well as a computer program product and a computer-readable memory medium for controlling the system unit according are provided, having at least partially the described effects. Advantageous embodiments are the present invention are disclosed herein.

According to one aspect of the present invention, a system unit for an at least semi-automated mobile platform including at least one first actuator system and one second actuator system is provided, which each include at least one auxiliary operating mode and one emergency operating mode. In the process, the first actuator system and the second actuator system are each configured and coupled to switch into an inactive operating mode when a critical error is identified in the respective actuator system. The first actuator system and the second actuator system are furthermore configured and coupled to switch into an auxiliary operating mode when one of the actuator systems switches into the inactive operating mode in order to carry out at least portions of a functionality of the respective actuator system which is in the inactive operating mode. In addition, the first actuator system and the second actuator system are configured and coupled to switch into an emergency operating mode when a critical error is identified in the respective actuator system in the auxiliary operating mode.

In this way, a further safety level in the form of the emergency operating mode is provided with this system unit, which is only active when a second critical error of the system unit occurs, i.e., a first error of the respective actuator system remaining active in the auxiliary operating mode.

The actuator system remaining active may, for example, meet all requirements with regard to the system unit in the auxiliary operating mode of the actuator system until the critical error occurs in the auxiliary operating mode. After the second error of the system unit, the actuator system which is still active is to provide a functionality for risk minimization for the mobile platform or vehicle occupants of the mobile platform. In the process, this functionality may have a drastically reduced requirement compared to a normal operating mode.

For example, a further safety level may be provided for a system unit in the form of a braking system, which is only active when a second error impairs the still remaining braking unit. The respective active actuator system in the auxiliary operating mode, in the form of a braking unit of the braking system which remains active, may meet all requirements with regard to a fallback level of conventional braking systems until the second error. After the second error of the braking system, a maneuver for risk minimization for the vehicle occupants may be carried out with the remaining active actuator system of the braking system, such as, for example, the remaining active braking unit, with a reduced functionality. For such a maneuver, only drastically reduced requirements still apply with regard to stability and dynamics of the mobile platform equipped with such a braking system.

In this way, using such a system unit, an operating mode which is as robust as possible may be provided for such a system unit, such as, for example, of a braking system, which is able to bring the mobile platform, such as, for example, a vehicle, into a safe state in the described error case with a minimum of sensor systems, communication, and actuator systems.

When such a system unit is implemented in the form of a redundant braking system, a braking system for highly autonomous driving may thus be provided.

In this way, a risk of a (total) failure may thus be minimized using this system unit, without having to use a third actuator system, in that, in the described form, a further safety level is implemented in both actuators of the system unit. This further safety level is switched to the active state in the respective actuator system, which in the first fallback level, for example, provides a braking functionality when an error is also identified or recognized on exactly this actuator system.

In this way, the system unit in accordance with the present invention provides a further safety level, which is largely independent of errors of the respective actuator systems and/or of the sensor system and/or of a communication between control units of the actuator systems to continue to be able to carry out an (emergency) brake application.

For this purpose, in accordance with an example embodiment of the present invention, the respective actuator system includes a control mechanism, which may exclusively directly activate a minimal functionality. In the case of braking systems, this may relate both to the hydraulic valves, if these have to be switched into a certain position for pressure build-up in the actuator system, and to the engine control unit. Using such a system unit, a redundant braking system may be provided for highly autonomous driving operations.

Advantageously, the system unit is thus also not automatically deactivated after two critical errors have occurred or been identified in such a system unit, such as, for example, of a braking system, made up of a primary and a secondary braking unit, but an (emergency) brake application, for example, is still carried out.

In other words, the primary braking unit may thus implement the full functional scope without the secondary braking unit when a first critical error occurs, or the secondary braking unit may take over a portion of the functional scope of the primary unit.

As a result, a further safety level is provided, which is only active when a second error of the system unit impairs the still remaining braking unit. The remaining braking unit may, for example, meet all requirements with regard to the fallback level of conventional braking systems until a second error occurs in the braking system. Due to this additional fallback level, additional safety may be provided in a situation in which only one of the two braking units is functional. The respective actuator system may be configured in the process to additionally carry out at least portions of a functionality of the respective other actuator system.

According to one aspect of the present invention, it is provided that the first actuator system and the second actuator system are each configured and coupled to receive a setpoint value and to check, in the emergency operating mode, whether the setpoint value is presently being received.

Such a setpoint value may be predefined for the respective actuator system to set the setpoint value in a control loop or according to a characteristic curve. Since the communication with setpoint-generating sensors may be disrupted in the event of an error, it may be checked in an emergency operating mode whether such a communication in the form of the reception of setpoint values is intact. The further behavior of the respective actuator system in the emergency operating mode may then be made dependent on the setpoint value.

According to one aspect of the present invention, it is provided that the first actuator system and the second actuator system are each configured and coupled, in the emergency operating mode, to carry out a first action with the received instantaneous setpoint value and/or to carry out a second action without the received instantaneous setpoint value, the first action being carried out as a function of a value of the received instantaneous setpoint value.

Such a setpoint value may, for example, be transferred via a bus system from a setpoint-generating system and/or a sensor to the respective actuator system. The system unit may be configured to check this transfer or communication, for example in the emergency operating mode, in order to be able to decide whether such a setpoint value may be implemented, for example in the form of a braking force of a virtual driver of an at least semi-automated mobile platform. A first action may, for example, relate to an action which is implemented according to the value of the setpoint value, and the second action may, for example, relate to an action which is fixedly predefined. For a braking system, the first action may correspond to a brake application using a predefined braking force or an accordingly predefined braking profile, and the second action may be a predefined emergency brake application. In the process, the first action may be implemented with the aid of a control loop and/or a control with the aid of a characteristic curve.

To keep the dependence of the system unit on internal and external signals, which in this emergency operating mode are possibly no longer monitored, as low as possible, the activation of the actuator system in the emergency operating mode may be activated in a characteristic curve-based manner and/or be controlled using a full control.

Such a check of the functionality of the communication with a setpoint-generating system may be assessed as positive when instantaneous setpoint values are transferred to the respective actuator system at the respective point in time. For example, in the case of the second action, the mobile platform, such as, for example, a semi-automated vehicle, may be brought into a safe state, for example with the aid of a brake application.

According to one aspect of the present invention, it is provided that the critical error is identified by the respective actuator system itself and/or the respective other of the actuator systems and/or a higher-level system. When the presence of a critical error of the respective actuator system is identified by a higher-level system, further variables and dependencies with other systems may be taken into consideration. When the respective actuator system identifies the critical error itself, a greater independence and corresponding lower susceptibility with respect to, in particular, external errors may be achieved.

According to one aspect of the present invention, it is provided that the first actuator system is an electronic brake booster (eBKV) system, and the second actuator system is an electronic stability program (ESP) system of a mobile platform; or the first actuator system is a first steering system of a mobile platform, and the second actuator system is a second steering system of a mobile platform; or the first actuator system is an integrated power brake (IPB) system, and the second actuator system is a redundant brake unit (RBU) of a mobile platform.

In the process, the second steering system may be configured as a redundant system for the first steering system. In the process, the integrated power brake (IPB) system including the redundant brake unit (RBU) is a redundant braking system combination, which is an alternative for a system made up of an electronic brake booster (eBKV) system and an electronic stability program (ESP) system for automated driving. In the process, the integrated power brake (IPB) system takes over the tasks of eBKV and ESP including an actuator system, i.e., in other words, a one-box braking system. The redundant brake unit (RBU) exclusively takes over the functions of the brake pressure build-up and stabilization in the event of an error of the integrated power brake (IPB) system, and is thus completely passive otherwise.

Due to the configuration of a braking system corresponding to the system unit, the resulting safety of the braking system may be provided.

In accordance with the present invention, a use of the above-described system unit for controlling an at least semi-automated mobile platform is provided. The above-described additional safety of the described system unit results in the corresponding safety for at least semi-automated mobile platforms.

In accordance with an example embodiment of the present invention, a method for controlling a system unit for an at least semi-automated mobile platform including a first actuator system and a second actuator system is provided, the first actuator system and the second actuator system each including an auxiliary operating mode and an emergency operating mode, and the method including the following steps. In a first step, the respective actuator system switches into an inactive operating mode when a critical error is identified in the respective actuator system. In a further step, the respective actuator system switches into an auxiliary operating mode when one of the actuator systems switches into the inactive operating mode in order to carry out at least portions of the functionality of the respective actuator system which is in the inactive operating mode. In a further step, the respective actuator system, which is in the auxiliary operating mode, switches into an emergency operating mode when a critical error is identified in this actuator system.

In this entire description of the present invention, the sequence of method steps is represented in such a way that the method is easily comprehensible. Those skilled in the art, however, will recognize that many of the method steps may also be run through in a different order and lead to the same or a corresponding result. Within this meaning, the order of the method steps may be changed accordingly. Some features are denoted by numerals to improve the readability or to render the assignment clearer; however, this does not imply a presence of certain features.

The above-described advantages of the system unit result accordingly for the method for controlling a system unit, as described here, as well as for the further aspects of the method.

According to one aspect of the present invention, it is provided that, in the method for controlling a system unit, the actuator system in the emergency operating mode also checks whether a setpoint value for the first actuator system and/or the second actuator system is presently being received.

Such a setpoint value may be predefined for the respective actuator system to set the setpoint value in a control loop or according to a characteristic curve. Since the communication with setpoint-generating sensors may be disrupted in the event of an error, it may be checked in an emergency operating mode whether such a communication in the form of the reception of setpoint values is intact. The further behavior of the respective actuator system in the emergency operating mode may then be made dependent on the setpoint value.

According to one aspect of the present invention, it is provided that, in the method for controlling a system unit, the actuator system in the emergency operating mode, using the instantaneously received setpoint values, carries out a first action with a value of the instantaneously received setpoint value and/or carries out a second action without a received instantaneous setpoint value.

According to one aspect of the present invention, it is provided, in the method for controlling a system unit with the aid of predefined characteristic curves of the actuator system in the emergency operating mode, such as, for example, for an engine current, and/or for predefined valve positions, corresponding to a valve switching pattern, of the actuator system in the emergency operating mode, that the actuator system in the emergency operating mode carries out the first action with the value of the received instantaneous setpoint value.

With this, it can be achieved that the method for controlling a system unit may be designed to be as robust as possible and not very complex for the first action.

In accordance with an example embodiment of the present invention, a method is provided which, based on the identified critical error and/or inactive operating mode and/or auxiliary operating mode and/or emergency operating mode of the method for controlling a system unit, a control signal for activating an at least semi-automated vehicle is provided and/or, based on the identified critical error and/or inactive operating mode and/or auxiliary operating mode and/or emergency operating mode, a warning signal for warning a vehicle occupant is provided.

The term "based on" shall be understood broadly with respect to the feature that a control signal is provided based on the identified critical error and/or inactive operating mode and/or auxiliary operating mode and/or emergency operating mode of the method for controlling a system unit.

It shall be understood in such a way that the identified critical error and/or the inactive operating mode and/or the auxiliary operating mode and/or the emergency operating mode of the method for controlling a system unit is/are used for any determination or calculation of a control signal, this not precluding other input variables from also being used for this determination of the control signal.

Since in an accordingly limited operating mode, such as the auxiliary operating mode or the emergency operating mode, the corresponding functionality, such as, for example, a sufficient deceleration, cannot always be ensured, a higher-level unit or controller, such as a virtual and/or a real driver, may be informed about this limitation. In this way, further functionalities may be retrieved from a higher-level unit, such as, for example, a support of the brakes with the aid of secondary actuator systems, such as, for example, an engine control unit, a parking brake, or steering interventions for collision avoidance.

In accordance with an example embodiment of the present invention, a device is provided, which is configured to carry out one of the above-described methods. Using such a device, the corresponding method may be easily integrated into different systems.

In accordance with an example embodiment of the present invention, a computer program is provided, encompassing commands which, during the execution of the computer program by a computer, prompt the computer to carry out the above-described method. Such a computer program allows the use of the described method in different systems.

In accordance with an example embodiment of the present invention, a machine-readable memory medium is provided, on which the above-described computer program is stored. With the aid of such a machine-readable memory medium, the above-described computer program is portable.

A mobile platform shall be understood to mean an at least semi-automated system which is mobile, and/or a driver assistance system of a vehicle. For example, it may be an at least semi-automated vehicle or a vehicle including a driver assistance system. This means, in this connection, an at least semi-automated system includes a mobile platform with respect to an at least semi-automated functionality, but a mobile platform also includes vehicles and other mobile machines, to include driver assistance systems. Further examples of mobile platforms may be driver assistance systems including multiple sensors, mobile multi-sensor robots, such as, e.g., robot vacuum cleaners or lawn mowers, a multi-sensor monitoring system, a manufacturing machine, a personal assistant, or an access control system. Each of these systems may be a fully automated or semi-automated system.

In addition, it shall be pointed out that "including" does not exclude other elements, and that "a" or "an" does not exclude a plurality. It shall moreover be pointed out that features which were described with reference to one of the above-mentioned exemplary embodiments may also be used in combination with other features of other above-described exemplary embodiments. Reference numerals shall not be regarded as limiting.

BRIEF DESCRIPTION OF THE DRAWINGS

Exemplary embodiments of the present invention are shown in FIGS. 1 through 2 and are described in greater detail hereafter.

DETAILED DESCRIPTION OF EXAMPLE EMBODIMENTS

Figure 1:
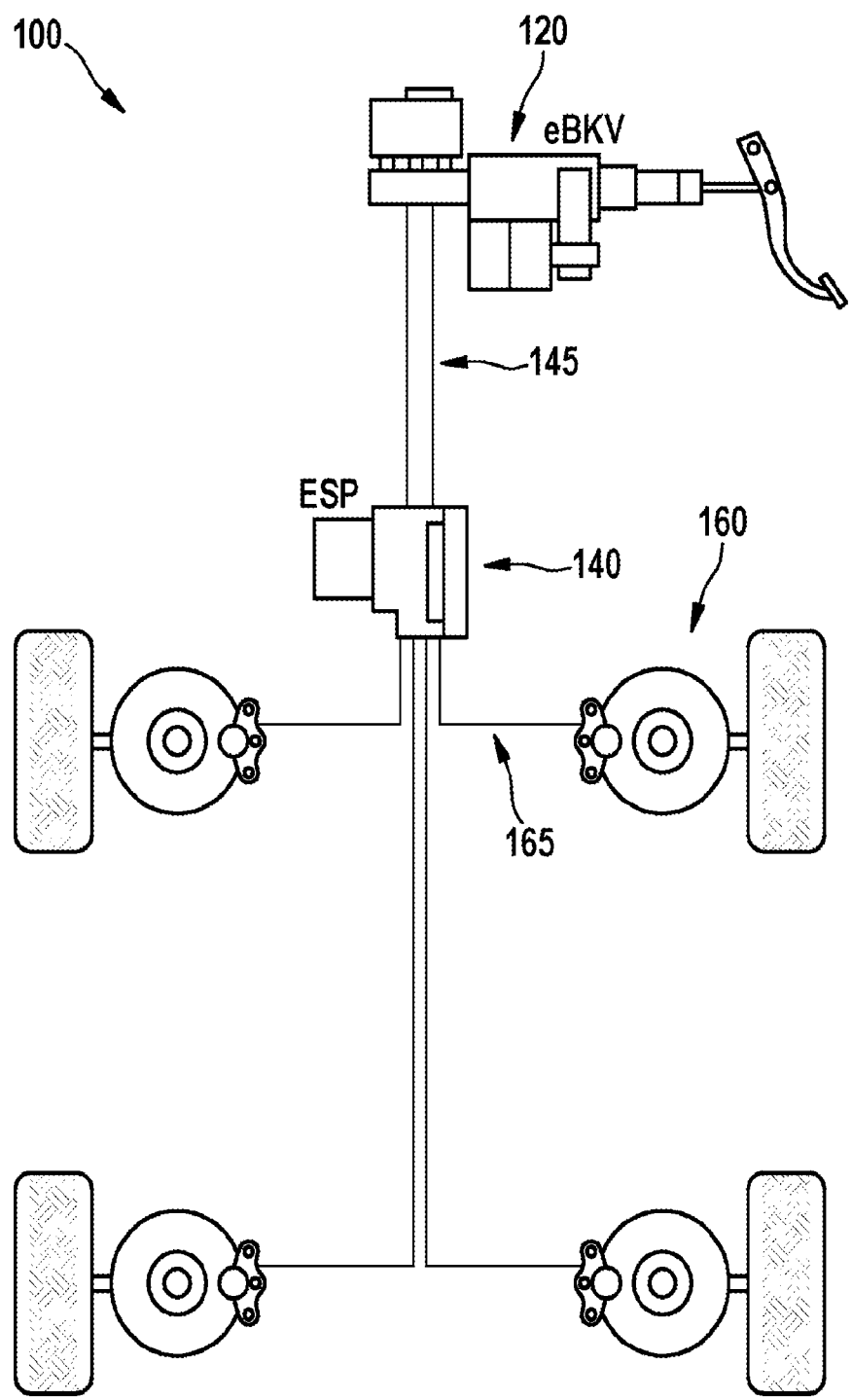
FIG. 1 shows an outlined braking system including an electromechanical brake booster and an electronic stability program system, in accordance with an example embodiment of the present invention.

FIG. 1 outlines a redundant design of a braking system 100 including at least one first actuator system 120 in the form of an electromechanical brake booster 120, with the option for single-channel active and possibly passive pressure modulation, such as, e.g., of a fail boost unit or an electromechanical brake booster, and a second actuator system 140 in the form of an electronic stability program system 140 for the wheel-specific active and passive pressure modulation, e.g., with the aid of an ESP recirculating hydraulic system, which are hydraulically coupled via a connection 145. In the process, electronic stability program system 140 is coupled via a further hydraulic connection 165 to a braking system 100 of the tires of the vehicle. In the process, first actuator system 120 and second actuator system 140 may also be coupled in terms of signaling and/or electrically.

Figure 2:
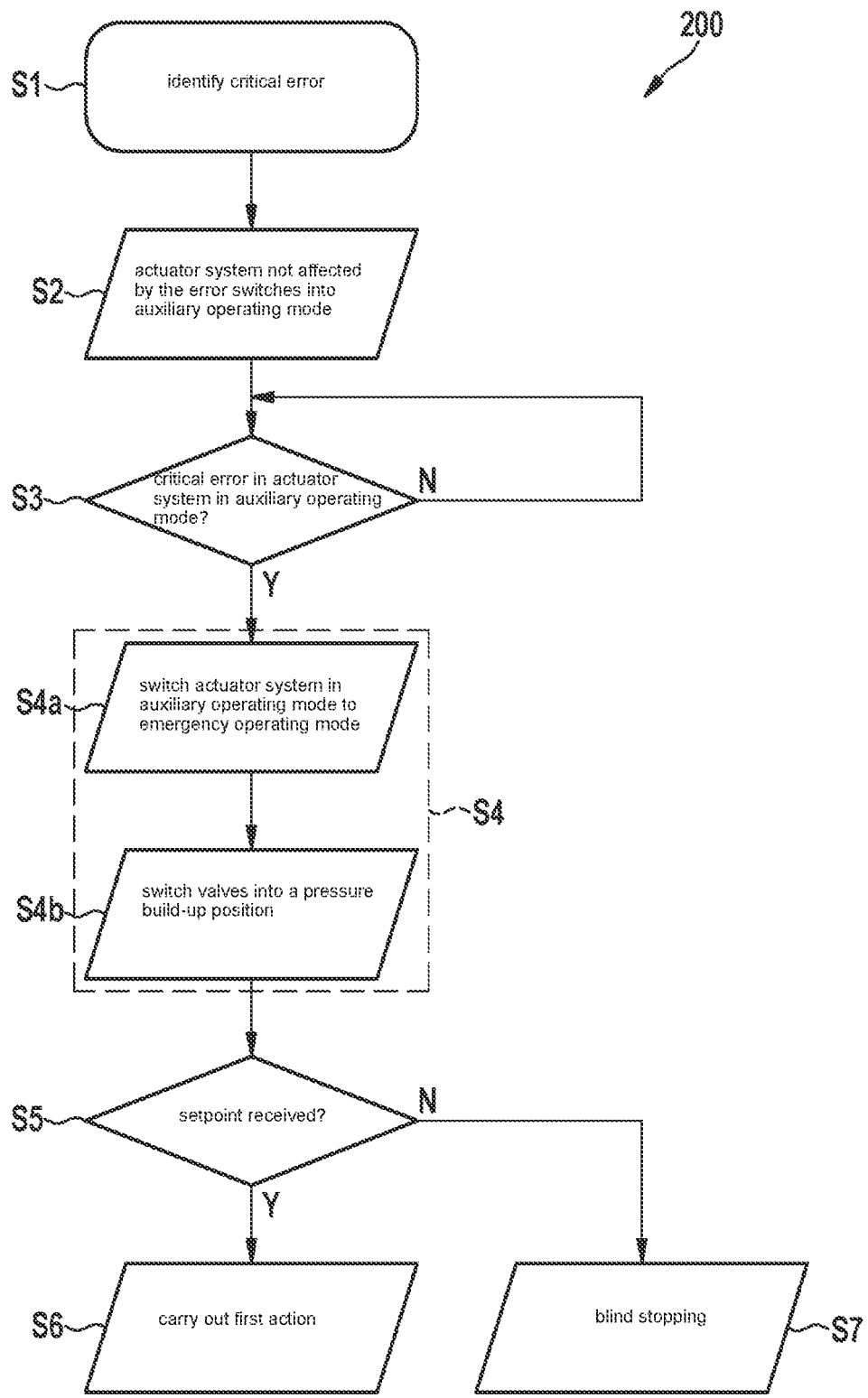
FIG. 2 shows a flowchart for a method for controlling a system unit for an at least semi-automated mobile platform including a first actuator system and a second actuator system, in accordance with an example embodiment of the present invention.

FIG. 2 lays out a flowchart of a method 200 for controlling a system unit in the form of braking system 100 for an at least semi-automatic mobile platform including a first actuator system 120 and a second actuator system 140, first actuator system 120 and second actuator system 140 each including an auxiliary operating mode and an emergency operating mode.

In a first step S1, a critical error is identified in a first or second actuator system 120, and the respective actuator system 120, 140 affected by the error switches into an inactive operating mode.

In a further step S2, the respective actuator system not affected by the error switches into an auxiliary operating mode to carry out at least portions of the functionality of the respective actuator system affected by the error, which is in the inactive operating mode.

In a further step S3, it is determined whether a critical error is identified in the respective actuator system, which is in the auxiliary operating mode.

In a further step S4, the respective actuator system, which is in the auxiliary operating mode, switches into an emergency operating mode S4a when a critical error is identified in this actuator system. In a braking system, valves may be switched S4b into a pressure build-up position for this purpose.

In a further step S5, the respective actuator system in the emergency operating mode checks whether a setpoint value for first actuator system 120 and/or second actuator system 140 is presently being received, or whether a bus communication with setpoint-generating systems or sensors is possible.

Depending on the result in step S5, when a received instantaneous setpoint value is present, the actuator system in the emergency operating mode will carry out a first action S6 with a value of the instantaneously received setpoint value, such as, for example, a brake application with the value of the setpoint value, for example via a characteristic curve-based activation of the actuator system motor.

As an alternative, without the presence of a received instantaneous setpoint value, a second action S7, such as, for example, an emergency stop of a vehicle, is carried out to minimize an accident risk (blind stopping).

What is claimed is:

1. A system unit for an at least semi-automated mobile platform, comprising:
   a first actuator system; and
   a second actuator system;
   wherein each of the first actuator system and the second actuator system including at least one auxiliary operating mode and one emergency operating mode, and wherein each respective actuator system of the first actuator system and the second actuator system being configured and coupled to:
   switch into an inactive operating mode when a critical error is identified in the respective actuator system; and
   switch into an auxiliary operating mode when one of the first and second actuator systems switches into the inactive operating mode, the auxiliary operating mode being configured to carry out at least portions of a functionality of the respective actuator system which is in the inactive operating mode; and
   switch into an emergency operating mode when a critical error is identified in the respective actuator system in the auxiliary operating mode, wherein the first actuator system and the second actuator system are each configured and coupled to receive a setpoint value and to check, in the emergency operating mode, whether receipt of the setpoint value is disrupted by determining in the emergency operating mode whether the setpoint value is received intact.

2. The system unit as recited in claim 1, wherein the first actuator system and the second actuator system are each configured and coupled to, in the emergency operating mode, carry out a first action with the received instantaneous setpoint value and to carry out a second action without the received instantaneous setpoint value, the first action being carried out as a function of a value of the received instantaneous setpoint value.

3. The system unit as recited in claim 1, wherein the critical error is identified by the respective actuator system itself and/or a respective other of the actuator systems and/or a higher-level system.

4. The system unit as recited in claim 1, wherein: (i) the first actuator system is an electronic brake booster system of a mobile platform, and the second actuator system is an electronic stability program system of the mobile platform; or (i) the first actuator system is a first steering system of the mobile platform, and the second actuator system is a second steering system of the mobile platform; or (iii) the first actuator system is an integrated power brake system of the mobile platform, and the second actuator system is a redundant brake unit of the mobile platform.

5. The system unit as recited in claim 1, wherein the system unit is configured to control an at least semi-automated mobile platform.

6. A method for controlling a system unit for an at least semi-automated mobile platform including a first actuator system and a second actuator system, each respective actuator system of the first and second actuator system including an auxiliary operating mode and an emergency operating mode, the method comprising the following steps:
   switching the respective actuator system into an inactive operating mode when a critical error is identified in the respective actuator system;
   switching the respective actuator system into an auxiliary operating mode when one of the first and second actuator systems switches into the inactive operating mode, the auxiliary operating mode configured to carry out at least portions of the functionality of the respective actuator system which is in the inactive operating mode; and
   switching the respective actuator system which is in the auxiliary operating mode, into an emergency operating mode when a critical error is identified in the respective actuator system which is in the auxiliary operating mode, wherein the first actuator system and the second actuator system are each configured and coupled to receive a setpoint value and to check, in the emergency operating mode, whether receipt of the setpoint value is disrupted by determining in the emergency operating mode whether the setpoint value is received intact.

7. The method as recited in claim 6, wherein the respective actuator system in the emergency operating mode checks whether a setpoint value is presently being received for the first actuator system and/or the second actuator system.

8. The method as recited in claim 7, wherein the respective actuator system in the emergency operating mode, with the received instantaneous setpoint value, carries out a first action with a value of the instantaneously received setpoint value and carries out a second action without the received instantaneous setpoint value.

9. The method as recited in claim 8, wherein the respective actuator system in the emergency operating mode carries out the first action with the value of the received instantaneous setpoint value, using predefined characteristic curves of the respective actuator system in the emergency operating mode and/or predefined valve positions of the respective actuator system in the emergency operating mode.

10. The method as recited in claim 7, wherein: (i) based on the identified critical error and/or the inactive operating mode and/or the auxiliary operating mode and/or the emergency operating mode, a control signal for activating an at least semi-automated vehicle is provided; and/or (ii) based on the identified critical error and/or inactive operating mode and/or auxiliary operating mode and/or emergency operating mode, a warning signal for warning a vehicle occupant is provided.

11. A device configured to control a system unit for an at least semi-automated mobile platform including a first actuator system and a second actuator system, each respective actuator system of the first and second actuator system including an auxiliary operating mode and an emergency operating mode, the device configured to:
   switch the respective actuator system into an inactive operating mode when a critical error is identified in the respective actuator system;
   switch the respective actuator system into an auxiliary operating mode when one of the first and second actuator systems switches into the inactive operating mode, the auxiliary operating mode configured to carry out at least portions of the functionality of the respective actuator system which is in the inactive operating mode; and
   switch the respective actuator system which is in the auxiliary operating mode, into an emergency operating mode when a critical error is identified in the respective actuator system which is in the auxiliary operating mode, wherein the first actuator system and the second actuator system are each configured and coupled to receive a setpoint value and to check, in the emergency operating mode, whether receipt of the setpoint value is disrupted by determining in the emergency operating mode whether the setpoint value is received intact.

12. A non-transitory machine-readable memory medium on which is stored a computer program method for controlling a system unit for an at least semi-automated mobile platform including a first actuator system and a second actuator system, each respective actuator system of the first and second actuator system including an auxiliary operating mode and an emergency operating mode, the computer program, when executed by a computer, causing the computer to perform the following steps:

switching the respective actuator system into an inactive operating mode when a critical error is identified in the respective actuator system;

switching the respective actuator system into an auxiliary operating mode when one of the first and second actuator systems switches into the inactive operating mode, the auxiliary operating mode configured to carry out at least portions of the functionality of the respective actuator system which is in the inactive operating mode; and switching the respective actuator system which is in the auxiliary operating mode, into an emergency operating mode when a critical error is identified in the respective actuator system which is in the auxiliary operating mode, wherein the first actuator system and the second actuator system are each configured and coupled to receive a setpoint value and to check, in the emergency operating mode, whether receipt of the setpoint value is disrupted by determining in the emergency operating mode whether the setpoint value is received intact.

* * * * *